(12) United States Patent
Baek et al.

(10) Patent No.: US 12,476,329 B2
(45) Date of Patent: Nov. 18, 2025

(54) BATTERY MODULE AND BATTERY PACK INCLUDING THE SAME

(71) Applicant: LG ENERGY SOLUTION, LTD., Seoul (KR)

(72) Inventors: Seung Ryul Baek, Daejeon (KR); Jong Min Lim, Daejeon (KR); Junkyu Park, Daejeon (KR); Soo Youl Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 812 days.

(21) Appl. No.: 17/624,059

(22) PCT Filed: Jul. 16, 2020

(86) PCT No.: PCT/KR2020/009392
§ 371 (c)(1),
(2) Date: Dec. 30, 2021

(87) PCT Pub. No.: WO2021/112364
PCT Pub. Date: Jun. 10, 2021

(65) Prior Publication Data
US 2022/0359955 A1 Nov. 10, 2022

(30) Foreign Application Priority Data
Dec. 5, 2019 (KR) .................. 10-2019-0160899

(51) Int. Cl.
*H01M 50/507* (2021.01)
*H01M 50/207* (2021.01)
(Continued)

(52) U.S. Cl.
CPC ....... *H01M 50/507* (2021.01); *H01M 50/207* (2021.01); *H01M 50/249* (2021.01); *H01M 50/258* (2021.01); *H01M 2220/20* (2013.01)

(58) Field of Classification Search
CPC ............ H01M 50/507; H01M 50/207; H01M 50/249; H01M 50/258; H01M 2220/20;
(Continued)

(56) References Cited

U.S. PATENT DOCUMENTS 10,658,716 B2   5/2020  Lee et al.
2010/0215998 A1  8/2010  Byun et al.
(Continued)

FOREIGN PATENT DOCUMENTS

CN   106856233 A   6/2017
CN   108483903 A   8/2018
(Continued)

OTHER PUBLICATIONS

International Search Report (PCT/IS/210) issued in PCT/KR2020/009392. dated Oct. 29, 2020.
(Continued)

*Primary Examiner* — Michael Y Sun
(74) *Attorney, Agent, or Firm* — Birch, Stewart, Kolasch & Birch, LLP (57) ABSTRACT

Discussed is a battery module which includes: a battery cell stack in which a plurality of battery cells are stacked; a lower frame that covers a lower surface and both side surfaces of the battery cell stack; an upper frame that covers an upper surface of the battery cell stack; busbar frames that respectively cover front front and rear surfaces of the battery cell stack; and a connector that connects the busbar frame at the front surface with the busbar frame at the rear surface, wherein the connector is formed of a flexible flat cable (FFC) and attached to the upper frame.

15 Claims, 9 Drawing Sheets

(51) Int. Cl.
   *H01M 50/249*   (2021.01)
   *H01M 50/258*   (2021.01)

(58) Field of Classification Search
   CPC ............ H01M 50/204; H01M 50/244; H01M 50/502; H01M 50/503; H01M 10/425; H01M 2220/30; H01M 50/20; Y02E 60/10; Y02T 10/70; C09J 2203/33
   See application file for complete search history.

(56) References Cited

U.S. PATENT DOCUMENTS

| | | | |
|---|---|---|---|
| 2015/0093615 A1 | 4/2015 | Yoshioka | |
| 2016/0323004 A1* | 11/2016 | Cho | H04B 1/3888 |
| 2016/0380319 A1* | 12/2016 | Rhein | H01M 50/569 429/90 |
| 2019/0001838 A1 | 1/2019 | Choi et al. | |
| 2019/0131596 A1 | 5/2019 | Yang et al. | |
| 2019/0296294 A1 | 9/2019 | Hirschbeck et al. | |
| 2019/0305268 A1* | 10/2019 | Ryu | H01M 50/224 |
| 2019/0348720 A1 | 11/2019 | Oh et al. | |
| 2019/0389318 A1 | 12/2019 | Lee et al. | |
| 2020/0014005 A1* | 1/2020 | Lee | F16M 11/22 |
| 2020/0062130 A1 | 2/2020 | Wuensche et al. | |
| 2020/0112014 A1 | 4/2020 | Kim et al. | |
| 2021/0194101 A1 | 6/2021 | Kim et al. | |
| 2021/0273267 A1 | 9/2021 | Yoon et al. | |
| 2022/0247004 A1 | 8/2022 | Yun | |

FOREIGN PATENT DOCUMENTS

| | | |
|---|---|---|
| CN | 110352513 A | 10/2019 |
| CN | 112470335 A | 3/2021 |
| EP | 3772124 A1 | 2/2021 |
| JP | 2013-218823 A | 10/2013 |
| JP | 2019-506728 A | 3/2019 |
| JP | 2019-511810 A | 4/2019 |
| JP | 2013-153543 A | 9/2019 |
| KR | 10-1050315 B1 | 7/2011 |
| KR | 10-2017-0036639 A | 4/2017 |
| KR | 10-2018-0018113 A | 2/2018 |
| KR | 10-2018-0038253 A | 4/2018 |
| KR | 10-2018-0064298 A | 6/2018 |
| KR | 10-2018-0074457 A | 7/2018 |
| KR | 10-2018-0099437 A | 9/2018 |
| KR | 10-2018-0099438 A | 9/2018 |
| KR | 10-2019-0027096 A | 3/2019 |
| KR | 10-2018-0073933 A | 6/2019 |
| KR | 10-1996449 B1 | 7/2019 |
| KR | 10-2019-0124022 A | 11/2019 |
| KR | 10-2020-0144422 A | 12/2020 |
| WO | WO 2018/159928 A1 | 9/2018 |
| WO | WO 2019/177275 A1 | 9/2019 |

OTHER PUBLICATIONS

Extended European Search Report dated Jul. 25, 2022 for Application No. 20897113.5.

* cited by examiner

BATTERY MODULE AND BATTERY PACK INCLUDING THE SAME

CROSS CITATION WITH RELATED APPLICATION(S)

This application claims the benefit of Korean Patent Application No. 10-2019-0160899 filed on Dec. 5, 2019 with the Korean Intellectual Property Office, the disclosure of which is incorporated herein by reference in its entirety.

The present disclosure relates to a battery module and a battery pack including the same, and more particularly to a battery module including an improved sensing connection part, and a battery pack including the same.

TECHNICAL FIELD

Background Art

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell first, and then configure a battery pack by using at least one of the battery modules and adding other components.

Such a battery module includes a battery cell stack in which a plurality of battery cells are stacked, busbar frames that are respectively formed at both ends of the battery cell stack, and a connection part that connects busbar frames at both ends.

Figure 1:
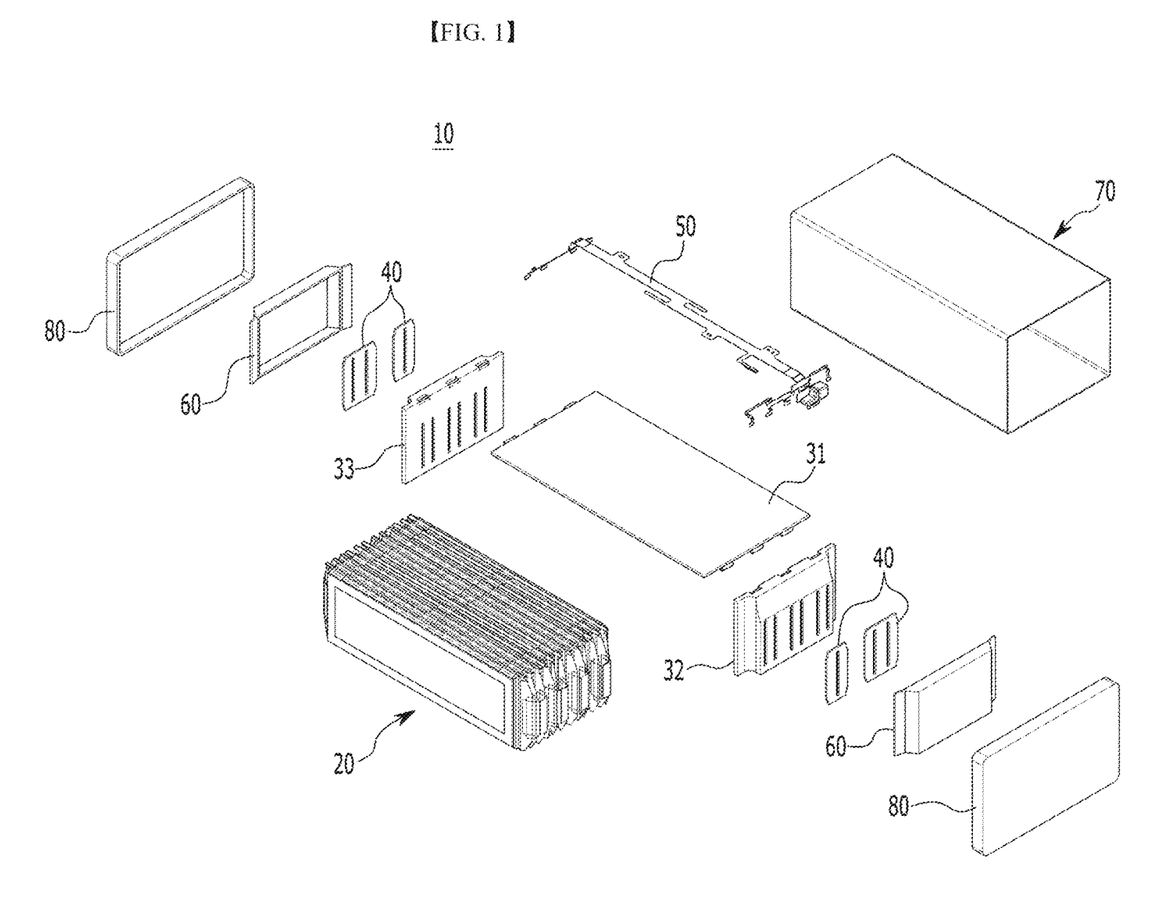
FIG. 1 is an exploded perspective view of a conventional battery module.

FIG. 1 is an exploded perspective view of a conventional battery module 10.

Referring to FIG. 1, the conventional battery module 10 includes a battery cell stack 20 in which a plurality of battery cells are stacked, a mono frame 70 that houses the battery cell stack 20, and end plates 80 that covers the opened front and rear surfaces of the mono frame.

Busbar frames 32 and 33, busbars 40, and insulators 60 are located in this order between the battery cell stack 20 and the end plate 80.

A flexible printed circuit (FPC) 50 for voltage sensing and temperature sensing of the battery cell may be located on the upper surface of the battery cell stack 20.

Conventionally, an attempt was made to connect the busbar frames 32 and 33 at both ends via the flexible printed board 50, and install the cover plate 31 at the upper end part of the flexible printed board 50, thereby preventing the flexible printed board 50 from being damaged when it is housed in the mono frame 70.

However, it is problematic that, due to the cover plate 31 disposed above the flexible circuit board 50 as disclosed in FIG. 1, the height of the battery module increases by the thickness, and the weight of the module increases.

When the size of the battery module increases in this way, it is problematic that when installing the battery module, more installation space is required, and when installing the battery module in a vehicle, the running performance of the vehicle is deteriorated.

Further, when the weight of the battery module increases, the utilization of the battery module is reduced in general, and similarly, when a heavy battery module is installed in the vehicle, the running performance of the vehicle decreases and thus the fuel efficiency decreases.

DETAILED DESCRIPTION OF THE INVENTION

Technical Problem

It is an object of the present disclosure to provide a battery module that enables automatic assembling of the connection part formed of a flexible flat cable and has an improved space utilization efficiency.

However, the problem to be solved by embodiments of the present disclosure is not limited to the above-described problems, and can be variously expanded within the scope of the technical idea included in the present disclosure.

Technical Solution

A battery module according to one embodiment of the present disclosure includes: a battery cell stack in which a plurality of battery cells are stacked; a lower frame that covers a lower surface and both side surfaces of the battery cell stack; an upper frame that covers an upper surface of the battery cell stack; busbar frames that are respectively formed on the front and rear surfaces of the battery cell stack; and a connection part that connects the busbar frames, wherein the connection part is formed of a flexible flat cable (FFC) and attached to the upper frame.

An adhesive member may be located between the connection part and the upper frame so that the connection part is attached to the upper frame.

An adhesive member may be a double-sided tape.

The connection part may be located between the upper frame and the battery cell stack.

The connection part may be formed in a flexible flat shape.

The connection part may include a connecting main body located on an upper surface of the battery cell stack; a connection cable formed in a curved shape from both ends of the connecting main body toward the busbar frames; and a connection part connector that is connected with the connection cable and respectively coupled to the busbar frames.

The connection part connector may be coupled with a connection member formed in the busbar frame.

A groove indented in a shape corresponding to the connection part may be formed on a lower surface of the upper frame, and the connection part may be attached to the groove.

An adhesive member may be located between the inner surface of the groove and the connection part.

The connection part may be formed to be parallel to the length direction of one of the plurality of battery cells.

The connection part may extend in a straight line shape between the busbar frames.

The lower frame may have an opened upper surface, and the upper frame may cover the opened upper surface of the lower frame.

Advantageous Effects

In the battery module and the battery pack including the same according to one embodiment of the present disclosure, the height of the battery module can be reduced due to the removal of the cover plate, thereby increasing the energy density of the battery module itself and securing the installation space for the battery module. Therefore, it is possible to bring about the effect of improving the running performance when the battery module or the battery pack is installed in a vehicle.

In addition, in the battery module and the battery pack including the same according to one embodiment of the present disclosure, the weight of the battery module is reduced due to the removal of the cover plate, the utilization of the battery module can be enhanced, and the fuel efficiency is improved when the battery module is installed in a vehicle.

Further, the connection part formed of a flexible flat cable is assembled while being attached to the upper frame, enhancing the manufacturing processability.

The effects of the present disclosure are not limited to the effects mentioned above and additional other effects not described above will be clearly understood from the description of the appended claims by those skilled in the art.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that it can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Figure 2:
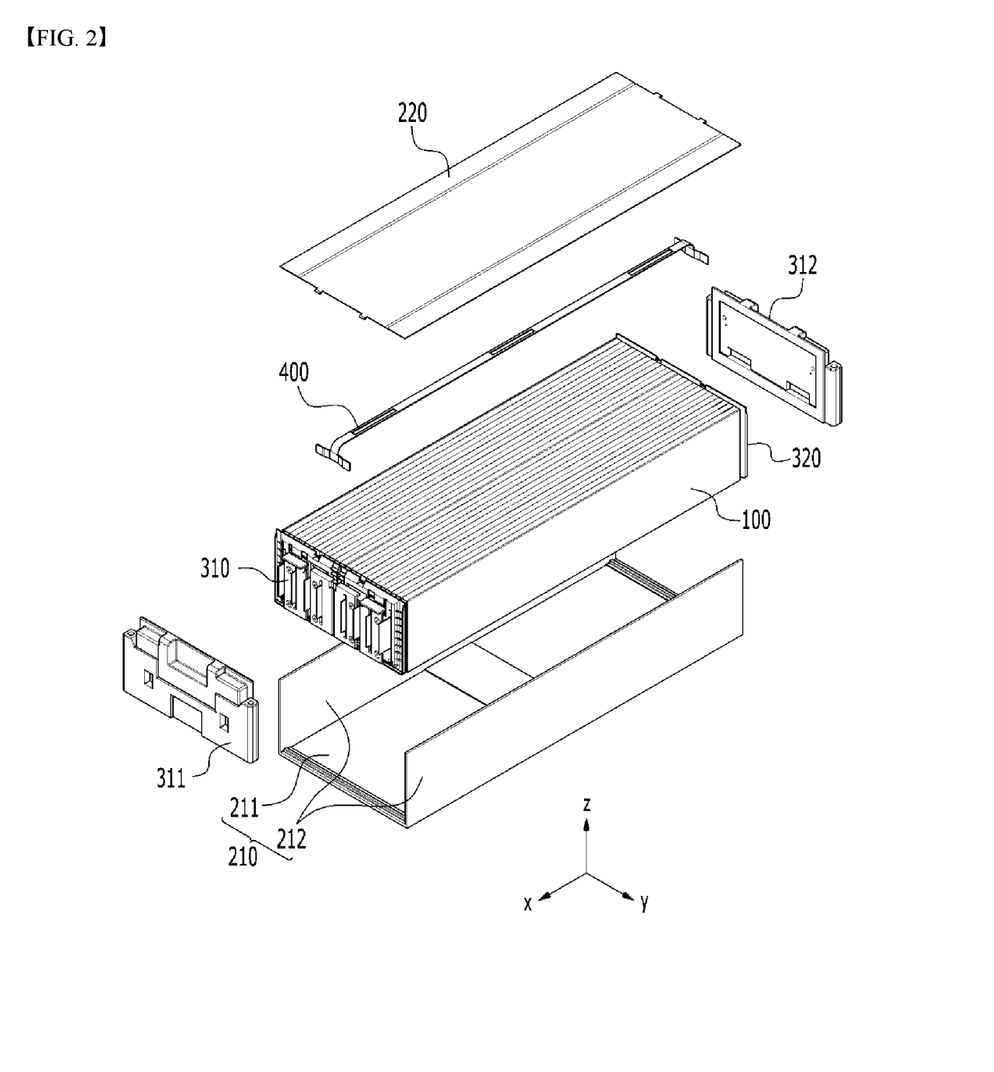
FIG. 2 is an exploded perspective view of the battery module according to one embodiment of the present disclosure.
Figure 3:
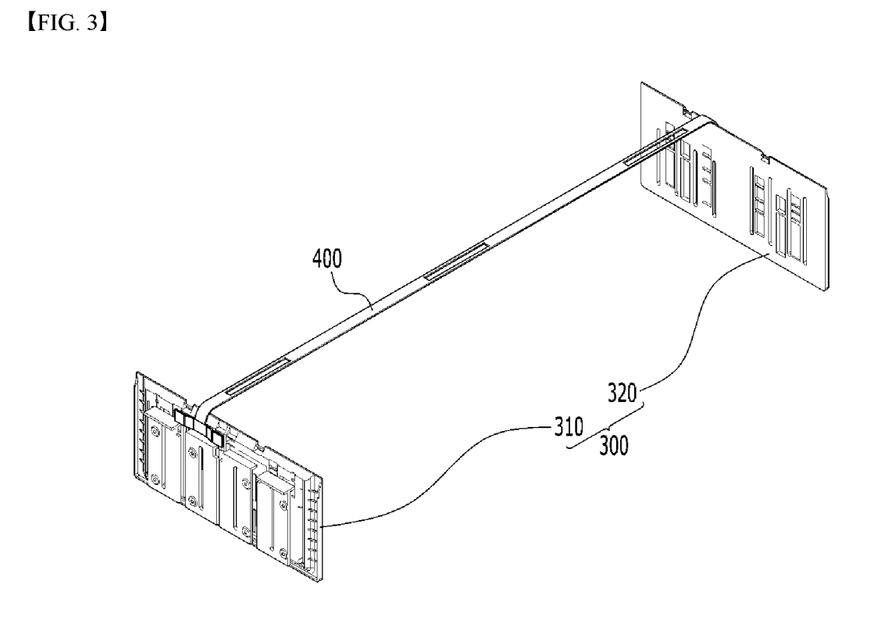
FIG. 3 is a diagram showing a state in which the connection part and the busbar frame included in the battery module of FIG. 2 are coupled.

FIG. 2 is an exploded perspective view of the battery module according to one embodiment of the present disclosure, and FIG. 3 is a diagram showing a state in which the connection part 400 and the busbar frame 300 included in the battery module of FIG. 2 are coupled.

Referring to FIGS. 2 and 3, the battery module according to one embodiment of the present disclosure includes: a battery cell stack in which a plurality of battery cells 100 are stacked; a lower frame 210 that covers a lower surface and both side surfaces of the battery cell stack; an upper frame 220 that covers an upper surface of the battery cell stack; busbar frames 300 respectively formed on the front and rear surfaces of the battery cell stack; and a connection part 400 that connects the busbar frames. For convenience of explanation, the connection part 400 and the upper frame 220 are shown to be separated from each other, but in the present embodiment, the connection part 400 is formed of a flexible flat cable (FFC) and attached to the upper frame 220. The features that the connection part 400 is attached to the upper frame 220 will be described later in FIGS. 4 and 5.

The battery cell 100 is a secondary battery and can be composed of a pouch-type secondary battery. Such battery cell 100 may be composed of a plurality of cells, and the plurality of battery cells 100 may be stacked together so as to be electrically connected to each other, thereby forming a battery cell stack. Although not specifically shown, each of the plurality of battery cells may include an electrode assembly, a battery case, and an electrode lead protruded from the electrode assembly. Meanwhile, as shown in FIG. 2, a plurality of battery cells 100 may be disposed in parallel with both side surfaces 212 of the lower frame 210 and be stacked in order along the y-axis direction.

The battery cell stack is surrounded by a lower frame 210 covering a lower surface and both side surfaces and an upper frame 220 covering the upper surface. The lower frame 210 is formed in a U-shaped structure with an opened upper surface (z-axis direction), and may include a bottom part 211 and both side surface parts 212 extended upward at both end parts of the bottom part 211.

The battery cell stack is inserted onto the bottom part 211 of the lower frame 210, and then the battery cell stack is mounted inside the frame by a method of covering the upper surface of the battery cell stack via the upper frame 220.

The lower frame 210 and the upper frame 220 are coupled together to house a battery cell stack located inside the frame. At this time, the two frames can be joined by welding, but the joining method of the frame is not limited thereto, and may be implemented through various embodiments.

Busbar frames 300 are respectively formed on the front and rear surfaces of the battery cell stack. The busbar frame 300 includes a busbar and a cell connecting board, and the electrode leads of the plurality of battery cells 100 may be electrically connected via a bus bar mounted on the bus bar frame 300. Specifically, the electrode leads of the battery cell 100 can be curved after passing through a slit formed in the bus bar frame 300 and connected with the busbar.

The busbar frame 300 is composed of a first busbar frame 310 formed on one side surface of the battery cell stack and a second busbar frame 320 formed on the other side surface of the battery cell stack, thereby electrically connecting the electrode leads on both sides of the battery cell stack.

End plates 311 and 312 may be coupled to the opened front and rear surfaces of the coupled lower frame 210 and upper frame 220. That is, the end plates 311 and 312 may cover the first and second busbar frames 310 and 320.

The end plates 311 and 312 can protect various electrical components provided in the first and second busbar frames 310 and 320 from external impacts, and at the same time, can guide electrical connection between the first and second busbar frames 310 and 320 and an external power source. An insulator can be inserted between the end plates 311 and 312 and the first and second busbar frames 310 and 320 to cut off unnecessary electrical connection between the busbar frames 310 and 320 and the end plates 311 and 312.

The connection part 400 is provided between the first and second busbar frames 310 and 320 to electrically connect the two busbar frames. Conventionally, a flexible printed circuit (FPC) is provided between the busbar frames, whereby the two busbar frames are connected via the flexible circuit board, and a cover plate is installed on the upper end part of the flexible printed board so as to prevent damage to the flexible printed board. However, according to one embodiment of the present disclosure, the cover plate that has protected and supported the flexible circuit board is removed, and the first and second busbar frames 310 and 320 are connected by using a cable formed of a flexible flat cable (FFC) formed of a flat cable that does not require a protective member such as a cover plate instead of a flexible printed board.

By connecting the two busbar frames via FFC in this way, the height of the battery module can be reduced, the energy density of the battery itself can be increased, the installation space for the battery module can be secured, and the running performance and the fuel efficiency can be improved when the battery module is installed in a vehicle.

According to one embodiment of the present disclosure, the connection part 400 formed of a flexible flat cable (FFC) is located between an upper frame 220 and a battery cell 100 stack. More specifically, an insulating film is formed on the upper surface of the battery cell 100 stack, and the connection part 400 is located between an insulating film and the upper frame 220.

The connection part 400 may be formed so as to be parallel to the length direction (x-axis direction) of any one of the plurality of battery cells 100. According to one embodiment of the present disclosure, the connection part 400 may be formed as so to be parallel to the length direction of the battery cell at a position corresponding to the 16th battery cell based on the outermost battery cell on one side of the plurality of battery cells 100. By allowing the position of the connection part to correspond to any one of the battery cells in this way, the connection part 400 may be more easily assembled.

The connection part 400 can be formed of a flexible cable to be curved. The circuit for electrical connection between busbar frames is inserted into the cable, thus making it easy to cope with external shocks.

Further, the connection part 400 may be formed in a flexible flat shape, that is, a flat shape. Therefore, it can be curved or bent more flexibly than in the case of a wire-type sensing circuit having a strong repulsive force against curving, and it is easy to set a certain position during automatic assembling. In addition, in the case of the wire type, an additional structure is required to protect the wire, and a separate assembling process is required rather than being not applicable directly to the battery module. However, the flexible flat cable can be applied directly to the assembling of the battery module without a separate protective structure.

Figure 4:
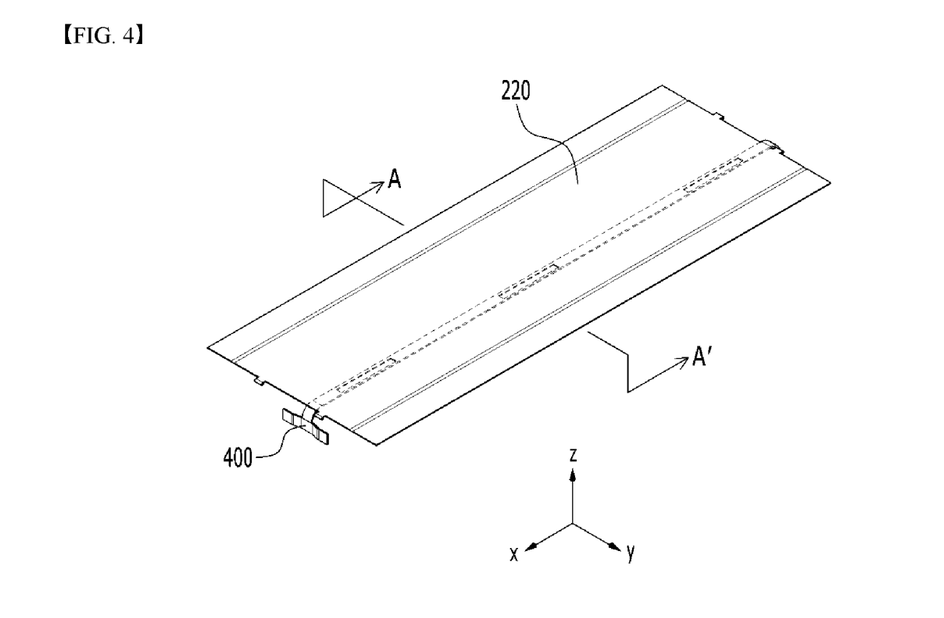
FIG. 4 is a perspective view showing the connection party and the upper frame included in the battery module of FIG. 2.
Figure 5:
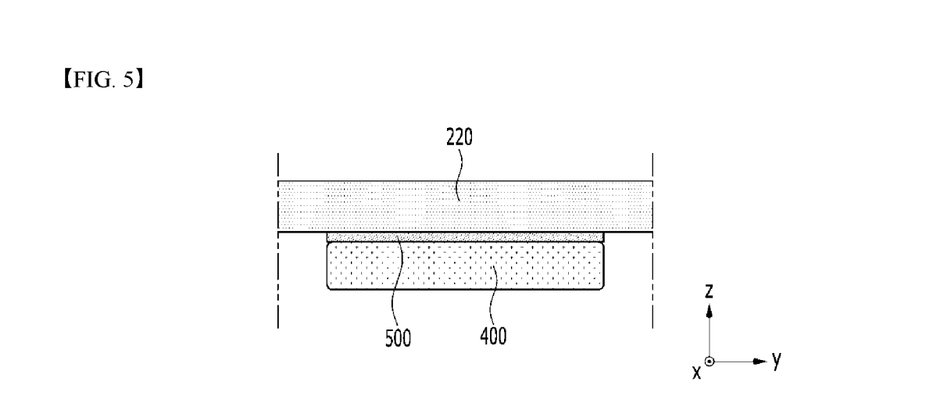
FIG. 5 is a cross-sectional view taken along the cutting line A-A' of FIG. 4.

FIG. 4 is a perspective view showing the connection party 400 and the upper frame 220 included in the battery module of FIG. 2, and FIG. 5 is a cross-sectional view taken along the cutting line A-A' of FIG. 3.

Referring to FIGS. 4 and 5, as described above, the connection part 400 is formed of a flexible flat cable (FFC) and attached to the upper frame 220. In particular, an adhesive member 500 is located between the connection part 400 and the upper frame 220, so that the connection part 400 can be attached to the upper frame 220. In this case, the adhesive member 500 may include a material having adhesive properties, and may be a double-sided tape.

Figure 6:
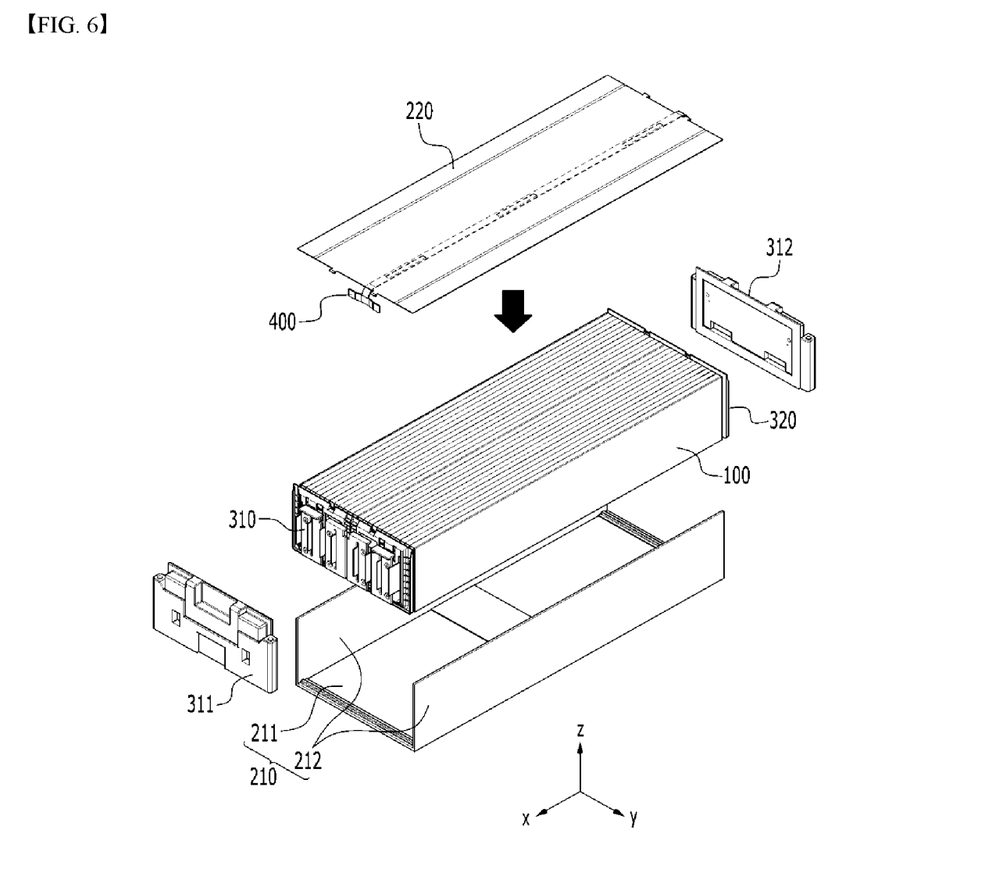
FIG. 6 is a perspective view for explaining the assembling method of the upper frame and the connection part.

FIG. 6 is a perspective view for explaining the assembling method of the upper frame and the connection part. Referring to FIG. 6, as described above, the lower frame 210 has an opened upper surface (z-axis direction), and the upper frame 220 can cover the opened upper surface (z-axis direction) of the lower frame 210 in a state where the battery cell stack is inserted on the bottom part 211 of the lower frame 210. The lower frame 210 and the upper frame 220 can be joined by a method such as welding.

At this time, according to the present embodiment, since the connection part 400 is attached to the upper frame 220, the lower frame 210 and the upper frame 220 are joined and at the same time, the connection part 400 can be located on the battery cell stack.

Unlike the conventional battery module, in the present embodiment, the connection part 400 may be formed of a flexible flat cable (FFC), the cover plate can be removed on the connection part 400, and the connection part 400 can be attached directly to the upper frame 220. Therefore, the upper frame 220 and the connection part 400 can be simultaneously assembled to complete the battery module, thereby improving the manufacturing processability.

Since the connection part 400 is assembled under a state attached to the upper frame 220, it is possible to reduce the possibility that the connection part 400 is incorrectly located outside a predetermined position on the battery cell stack during the assembling process.

Further, since the adhesive member 500 in the present embodiment has a much thinner thickness as compared with a conventional cover plate, it can reduce the height of the completed battery module, thereby increasing the energy density of the battery module itself and securing an installation space for the battery module. Therefore, it is possible to bring about the effect of improving the running performance when such a battery module or battery pack is installed in a vehicle.

Further, since the weight of the battery module is reduced due to the removal of the cover plate, the utilization of the battery module can be enhanced, and the fuel efficiency can be improved when the battery module is installed in a vehicle.

Figure 7:
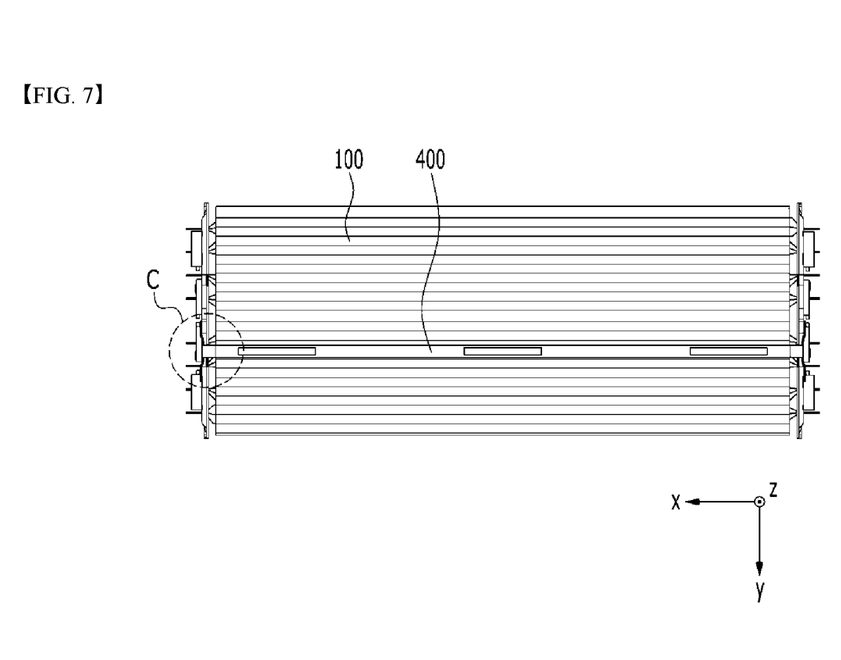
FIG. 7 is a top view of the connection part included in the battery module of FIG. 2 as viewed from above.
Figure 8:
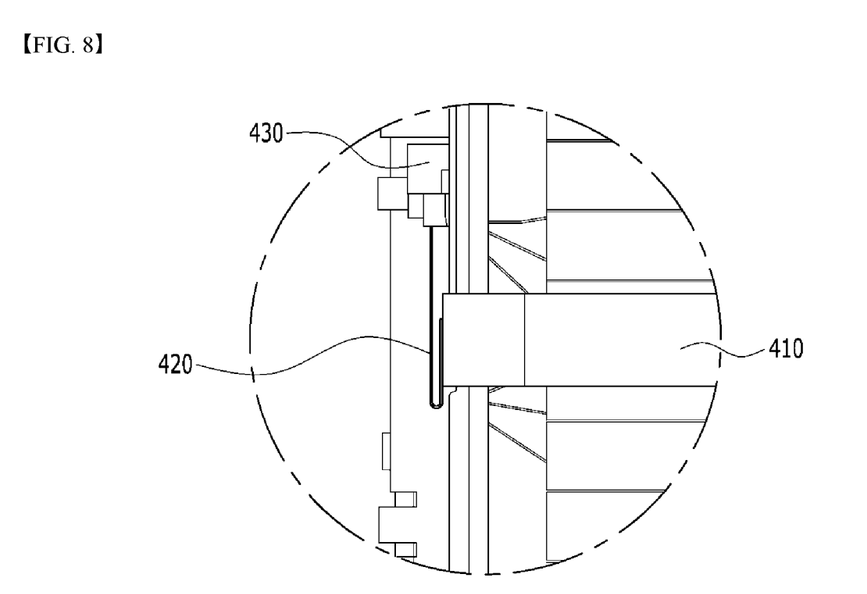
FIG. 8 is an enlarged view of the part "C" in FIG. 7.

FIG. 7 is a top view of the connection part included in the battery module of FIG. 2 as viewed from above, and FIG. 8 is an enlarged view of the part "C" in FIG. 7.

Referring to FIGS. 7 and 8, the connection part 400 may be formed so as to be parallel to the length direction (x-axis direction) of the plurality of battery cells 100, so that the connection part 400 may extend in a straight line shape between the bus bar frames 300. Thereby, the length of the connection part 400 can be minimized, the cost of manufacturing the connection part can be reduced, and when connecting with the busbar frame 300, it can be easily connected in the vertical direction.

Meanwhile, although not specifically shown, an insulating film may be formed on the upper surface of the battery cell 100 stack, and the connection part 400 may be located on the insulating film.

Meanwhile, according to the present embodiment, the connection part 400 may include a connecting main body 410 located on the upper surface of the battery cell 100 stack, a connection cable 420 formed in a curved shape at both ends of the connecting main body 410 in the direction of the first and second busbar frames 310 and 320, respectively, and a connection part connector 430 connected to the connection cable 420 and respectively coupled with the busbar frame 300.

Hereinafter, configurations of the first, second, and third connection cables and connection cable connectors according to one embodiment of the present disclosure will be described with reference to FIGS. 9 to 11.

Figure 9:
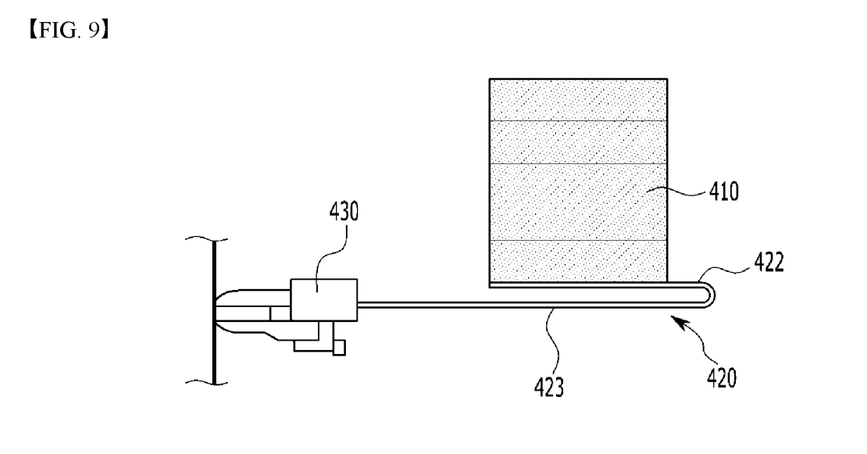
FIG. 9 is a view of the connection cable according to one embodiment of the present disclosure as viewed from above.

FIG. 9 is a view of the connection cable according to one embodiment of the present disclosure as viewed from above. FIG. 10 is a view of the connection cable according to one embodiment of the present disclosure as viewed from the front. FIG. 11 is a diagram showing a state in which the connection cable according to one embodiment of the present disclosure is installed on the busbar frame.

Figure 10:
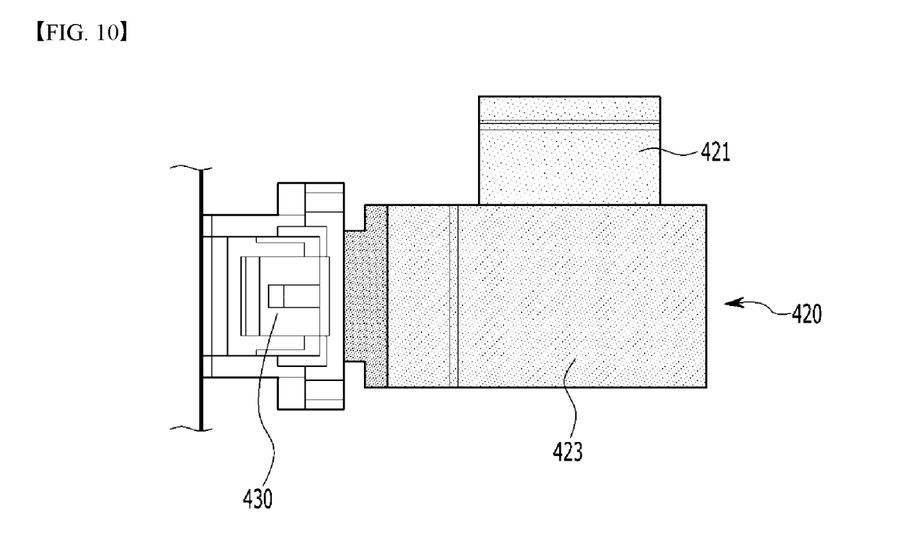
FIG. 10 is a view of the connection cable according to one embodiment of the present disclosure as viewed from the front.
Figure 11:
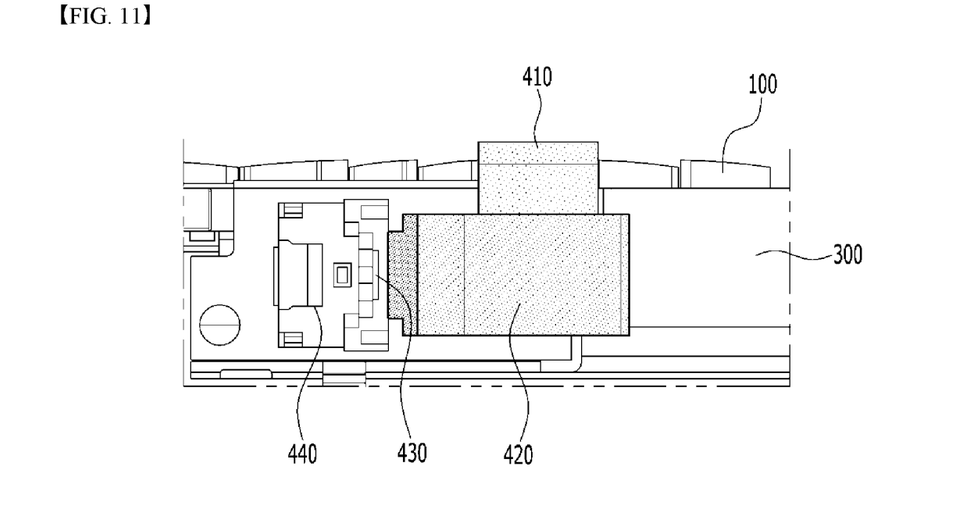
FIG. 11 is a diagram showing a state in which the connection cable according to one embodiment of the present disclosure is installed on the busbar frame.

Referring to FIGS. 9 to 11, the connection cable 420 may include a first connection cable 421 formed in a downward direction, a second connection cable 422 formed in a curved shape from the first connection cable 421 in one direction of the stacking directions of the battery cell 100, and a third connection cable 423 formed in a curved shape from the second connection cable 422 in the other direction among the stacking directions of the battery cell 100 stack. The connection cable 420 is formed in a flexible flat shape, and can be installed by being curved around a flat surface.

The connection part connector 430 can be connected with the third connection cable 423 and be coupled with the connection member 440 formed on one side of the busbar frame 300. More specifically, the connection member 440 is formed on the opposite side of the second connection cable 422 based on the first connection cable 421, and the third connection cable 423 is formed longer than the second connection cable 422.

Therefore, the connection cable 420 connected with the connecting main body 410 is first extended in the lower vertical direction along the frame surface of the busbar frame 300 through the first connection cable 421, and when reaching the height at which the connection member 440 is located, it is curved at 90 degrees via the second connection cable 422 and horizontally extended in the opposite direction of the connection member 440. After the second connection cable 422 is extended by a predetermined length, the second connection cable 422 can be curved at 180 degrees via the third connection cable 423 and horizontally extended in the direction in which the connection member 440 is located.

Further, the total length of the second connection cable 422 and the third connection cable 423 may be longer than the distance between the first connection cable 421 and the connection member 440. The connection cable 420 forms a curved portion in this way, and the second connection cable 422 and the third connection cable 423 secure an extra length, so that when the connection part 400 is pulled, an electrical connection route between busbars can be stably operated.

Hereinafter, with reference to FIGS. 12 to 14, the upper frame 220 in which the groove 221 is formed will be described as a modified embodiment of the present disclosure.

Figure 12:
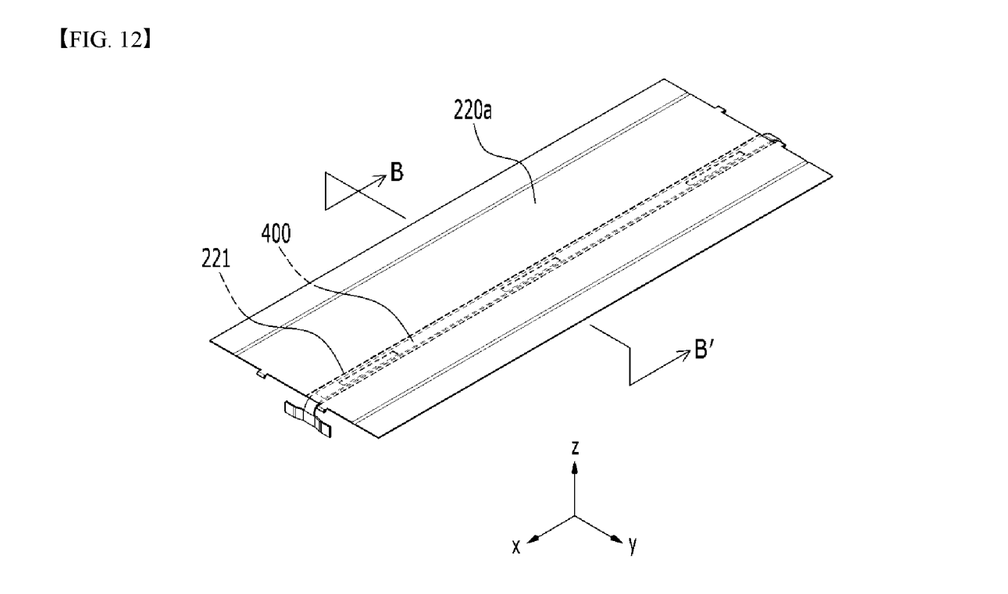
FIG. 12 is a perspective view showing a connection part and an upper frame in which a groove is formed.

FIG. 12 is a perspective view showing a connection part and an upper frame in which a groove is formed. FIG. 13 is a perspective view showing a state in which the connection part and the upper frame of FIG. 12 are turned upside down. FIG. 14 is a cross-sectional view taken along the cutting line B-B' of FIG. 12.

Figure 13:
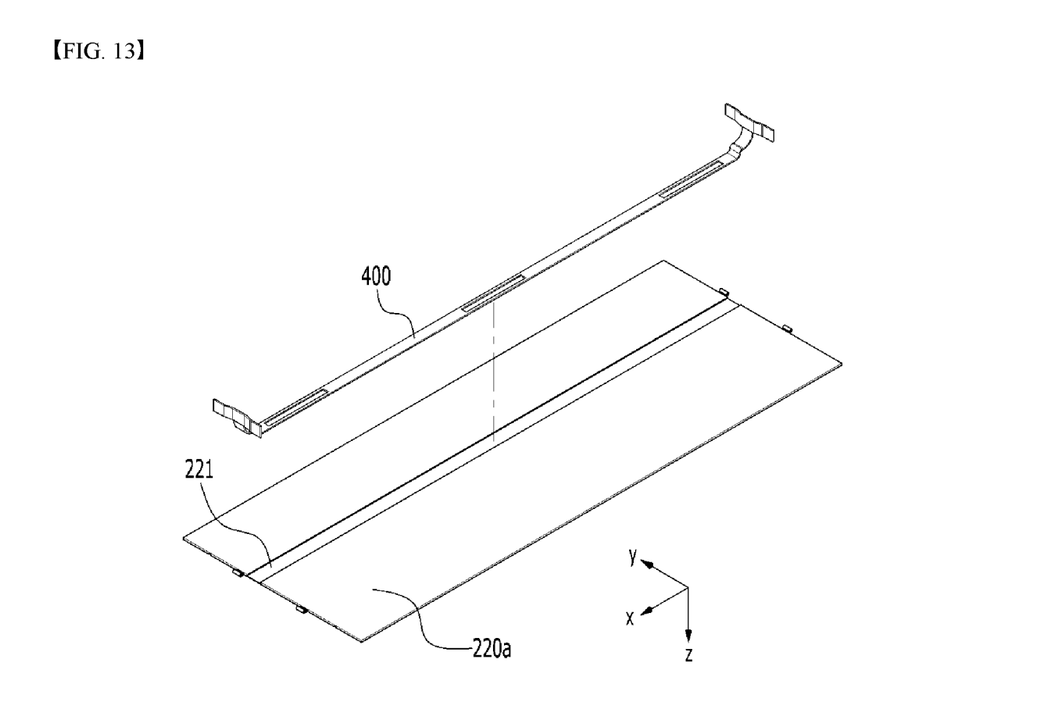
FIG. 13 is a perspective view showing a state in which the connection part and the upper frame of FIG. 12 are turned upside down.
Figure 14:
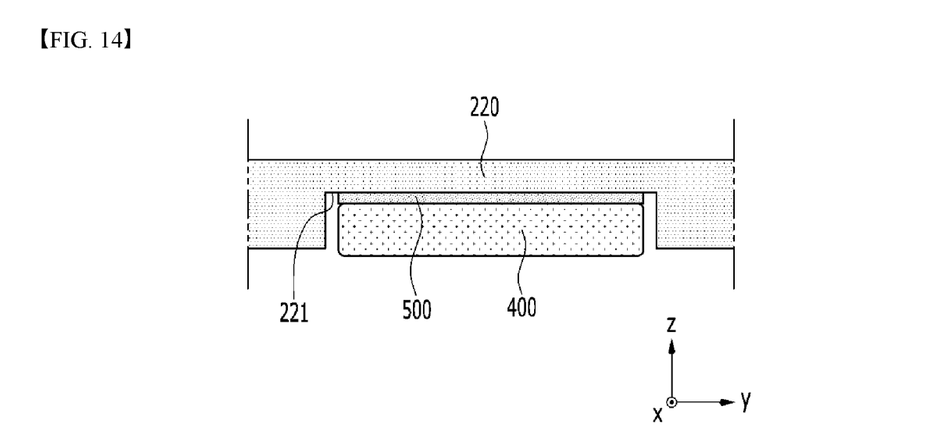
FIG. 14 is a cross-sectional view taken along the cutting line B-B' of FIG. 12.

Referring to FIGS. 12 to 14, a groove 221 indented in a shape corresponding to the connection part 400 is formed on the lower surface of the upper frame 220a, and the connection part 400 may be attached to the groove 221.

In particular, since the adhesive member 500 is located between the inner surface of the groove 221 and the connection part 400, the connection part 400 can be attached to the groove 221. In this case, the adhesive member 500 may include a material having adhesive properties, and be a double-sided tape.

The groove 221 may be indented in a shape corresponding to the connection part 400, but in order to facilitate attachment of the connection part 400, the width of the indented part is preferably slightly longer than the width of the connection part 400. Here, the width of the indented part and the width of the connection part 400 mean the length in the y-axis direction.

After the shape of the groove 221 is provided in advance in the upper frame 220a, the connection part 400 is assembled to the battery cell stack and the lower frame 210 in a state of being attached to the groove 221. Therefore, in the manufacture of the battery module, it is easy to arrange the connection part 400 at a predetermined place without error.

In addition, since the height of the completed battery module can be further reduced by the indented part, the structure of the groove 221 may further improve energy density and space efficiency of the battery module.

One or more battery modules according to the present embodiment described above may be mounted together with various control and protection systems such as a battery management system (BMS) and a cooling system to form a battery pack.

The battery module or the battery pack can be applied to various devices. These devices may be applied to transportation means such as an electric bicycle, an electric vehicle, a hybrid vehicle, but the present disclosure is not limited thereto and can be applied to various devices that can use the secondary battery.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
210: lower frame
220, 220a: upper frame
221: groove
300: busbar frame
310: first busbar frame
320: second busbar frame
311, 312: end plate
400: connection part
410: connecting main body
420: connection cable
421: first connection cable
422: second connection cable
423: third connection cable
430: connection part connector
440: connection member
500: adhesive member

The invention claimed is:

1. A battery module comprising:
a battery cell stack in which a plurality of battery cells are stacked;
a lower frame that covers a lower surface and both side surfaces of the battery cell stack;
an upper frame that covers an upper surface of the battery cell stack, the upper frame having a lower surface that faces the upper surface of the battery cell stack and an upper surface that is opposite to the lower surface;
busbar frames that respectively cover front and rear surfaces of the battery cell stack; and
a connector that connects the busbar frame at the front surface with the busbar frame at the rear surface, the connector being directly coupled to the lower surface of the upper frame,
wherein the connector is formed of a flexible flat cable (FFC) and attached to the lower surface of the upper frame.

2. The battery module according to claim 1,
wherein an adhesive member is attached to the lower surface of the upper frame, and the adhesive member is further located between the connector and the upper frame so that the connector is attached to the lower surface of the upper frame.

3. The battery module according to claim 2,
wherein an adhesive member is a double-sided tape.

4. The battery module according to claim 1,
wherein the connector is located between the lower surface of the upper frame and the battery cell stack.

5. The battery module according to claim 1,
wherein the connector is formed in a flexible flat shape.

6. The battery module according to claim 1,
wherein the connector comprises:
a connecting main body located on the upper surface of the battery cell stack;
a connection cable formed in a curved shape from the connecting main body toward the busbar frames; and
a connection part connector that is connected with the connection cable and respectively coupled to the busbar frames.

7. The battery module according to claim 1,
wherein the connection part connector is coupled to a connection member formed in each busbar frame.

8. The battery module according to claim 1,
wherein a groove indented in a shape corresponding to the connector is formed on the lower surface of the upper frame, and
wherein the connector is attached to the groove.

9. The battery module according to claim 8,
wherein an adhesive member is located between an inner surface of the groove and the connector.

10. The battery module according to claim 1,
wherein the connector is formed to be parallel to a length direction of one of the plurality of battery cells.

11. The battery module according to claim 1,
wherein the connector extends in a straight line shape between the busbar frames.

12. The battery module according to claim 1,
wherein the lower frame has an opened upper surface, and
wherein the upper frame covers the opened upper surface of the lower frame.

13. A battery pack comprising one or more battery modules as set forth in claim 1.

14. The battery module according to claim 1, wherein the lower frame entirely exposes the upper surface of the battery stack, includes a bottom part that entirely covers the lower surface of the battery cell stack, and includes side surfaces connected by the bottom part and on opposite ends of the bottom part, the side surfaces of the lower frame entirely covering the both side surfaces of the battery cell stack, respectively, and
wherein the upper frame are welded to the side surfaces of the lower frame.

15. The battery module according to claim 8, wherein the groove extends the entire length of the upper frame.

* * * * *